US010043192B2

(12) United States Patent
Smith et al.

(10) Patent No.: US 10,043,192 B2
(45) Date of Patent: Aug. 7, 2018

(54) SYSTEM, METHOD, AND USER INTERFACE FOR ADVERTISING VIA A VOICE CHANNEL

(75) Inventors: Charles Eric Smith, Austin, TX (US); Chris Tooley, Blanco, TX (US); Lanny Wayne Walker, Austin, TX (US); James Edward Butcher, Round Rock, TX (US); Roy Stacey Zuniga, Austin, TX (US)

(73) Assignee: Unwired Nation, Inc., Austin, TX (US)

( * ) Notice: Subject to any disclaimer, the term of this patent is extended or adjusted under 35 U.S.C. 154(b) by 994 days.

(21) Appl. No.: 11/474,674

(22) Filed: Jun. 26, 2006

(65) Prior Publication Data

US 2008/0010141 A1 Jan. 10, 2008

(51) Int. Cl.
*G06Q 30/02* (2012.01)
*H04M 3/493* (2006.01)
*H04M 3/487* (2006.01)

(52) U.S. Cl.
CPC ......... *G06Q 30/02* (2013.01); *G06Q 30/0241* (2013.01); *G06Q 30/0253* (2013.01); *G06Q 30/0264* (2013.01); *H04M 3/4938* (2013.01); *H04M 3/4878* (2013.01); *H04M 2201/40* (2013.01); *H04M 2207/20* (2013.01)

(58) Field of Classification Search
USPC .......................................................... 705/14
See application file for complete search history.

(56) References Cited

U.S. PATENT DOCUMENTS

| | | | |
|---|---|---|---|
| 6,607,136 B1 | 8/2003 | Atsmon et al. | |
| 6,888,929 B1 | 5/2005 | Saylor et al. | |
| 7,860,776 B1 | 12/2010 | Chin et al. | |
| 2002/0073034 A1 | 6/2002 | Wagner et al. | |
| 2003/0069740 A1* | 4/2003 | Zeidman | 705/1 |
| 2004/0031856 A1 | 2/2004 | Atsmon et al. | |
| 2004/0043770 A1 | 3/2004 | Amit et al. | |
| 2004/0073947 A1* | 4/2004 | Gupta | 725/134 |
| 2004/0148638 A1 | 7/2004 | Weisman et al. | |
| 2004/0254853 A1 | 12/2004 | Heene et al. | |
| 2005/0021387 A1 | 1/2005 | Gottfurcht | |
| 2005/0125331 A1 | 6/2005 | Dinwoodie | |
| 2005/0131894 A1 | 6/2005 | Vuong | |
| 2005/0136949 A1 | 6/2005 | Barnes, Jr. | |
| 2005/0144073 A1 | 6/2005 | Morrisroe et al. | |
| 2005/0144452 A1 | 6/2005 | Lynch et al. | |
| 2005/0202781 A1 | 9/2005 | Steelberg et al. | |
| 2007/0005482 A1* | 1/2007 | Graham | 705/37 |
| 2007/0011078 A1* | 1/2007 | Jain et al. | 705/37 |
| 2007/0136493 A1* | 6/2007 | Linner | 709/248 |
| 2007/0143205 A1* | 6/2007 | Starmanns et al. | 705/37 |
| 2007/0160184 A1* | 7/2007 | Altberg et al. | 379/114.13 |
| 2008/0215429 A1* | 9/2008 | Ramer et al. | 705/14 |

* cited by examiner

Primary Examiner — Alvin L Brown
(74) Attorney, Agent, or Firm — Toler Law Group, PC

(57) ABSTRACT

An audio interface for communicating information regarding an online auction item is disclosed and includes an announcement, wherein the announcement includes information that is associated with the online auction item. The audio interface also includes an authorization prompt to retrieve authentication information and an advertisement.

35 Claims, 10 Drawing Sheets

SYSTEM, METHOD, AND USER INTERFACE FOR ADVERTISING VIA A VOICE CHANNEL

FIELD OF THE DISCLOSURE

The present disclosure relates to communicating advertisements via voice channels.

BACKGROUND

As of May 2005, the Cellular Telecommunications Industry Association (CTIA) estimates that there are 182 million wireless subscribers in the United States. Further, the CTIA estimates that over 2.5 billion text messages are sent every month. Text messages, sent via short messaging service (SMS), are currently used by Internet companies to deliver notifications to mobile telephones. Unfortunately, text messaging is not secure, does not provide guaranteed delivery, is not free, and is not sent in real-time.

Regarding security issues, programs have been provided that can enable someone to spoof a sender's SMS address. Further, since SMS messages are sent using "store and forward" based systems, there is no guarantee that sent SMS messages are received within any particular timeframe. As such, some SMS providers present a disclaimer to their users that the provider is not responsible for messages that are lost or significantly delayed due to transmission via the Internet. Also, unlike voice calling plans, there currently are no "nights and weekends free" service plans for SMS messaging.

For certain e-commerce websites, e.g., online auction sites, text messaging is not a very efficient way to interact with the website because the auctions are typically fast paced and require confirmed delivery of bids. Further, the auction sites may utilize instant feedback for usability and understanding of the system. Moreover, a text messaging interface can be difficult to use with a mobile device due to the size of the text on a small display screen and the requirement to read the text. These problems become more evident while trying to send and receive text messages while driving.

Accordingly, there is a need for an improved system and method of communicating with e-commerce websites, e.g., auction websites.

DETAILED DESCRIPTION OF THE DRAWINGS

Figure 1:
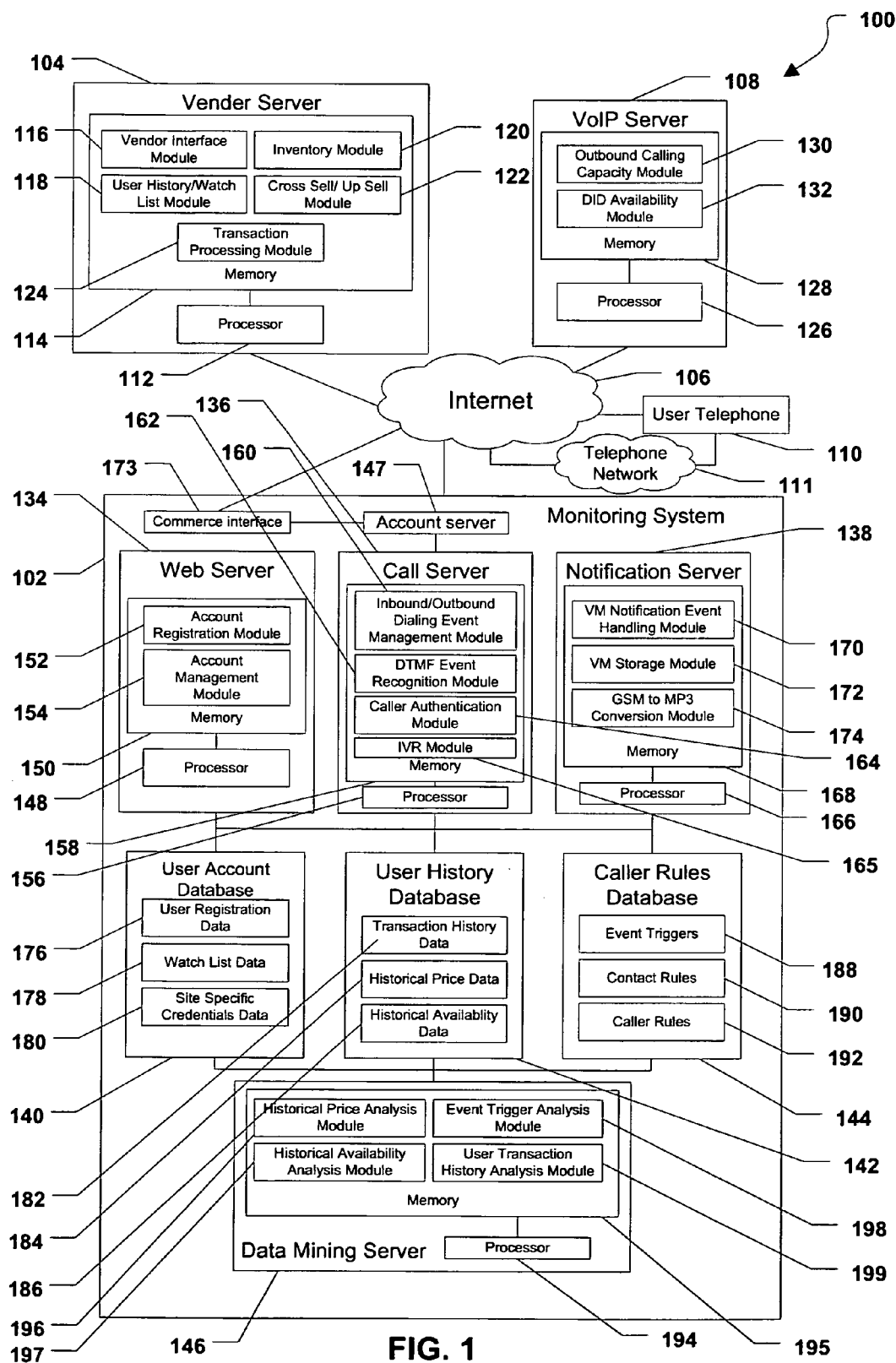
FIG. 1 is a block diagram representing a system of facilitating e-commerce.

An audio interface for communicating information regarding an online auction item is disclosed and includes an announcement, wherein the announcement includes information that is associated with the online auction item. The audio interface also includes an authorization prompt to retrieve authentication information and an advertisement.

In a particular embodiment, the advertisement is a targeted advertisement associated with the online auction item. Alternatively, the advertisement is a general advertisement. In another particular embodiment, the audio interface includes an advertisement-free time period in which advertisements are not communicated. The advertisement-free time period commences at a predetermined time before an end of an auction for the online auction item.

In yet another particular embodiment, the audio interface includes a first status update that is communicated during the advertisement-free time period and a user action prompt that is communicated during the advertisement-free time period. In a particular embodiment, the at least one user action prompt is a prompt to perform at least one of the following actions: increase a bid, increase a maximum bid, and purchase an item at a buy it now price. Further, the advertisement-free time period ends at the end of the auction for the online auction item.

In another particular embodiment, the audio interface includes a pre-final status announcement advertisement that is communicated after the advertisement-free time period ends. The pre-final status announcement advertisement can be a targeted advertisement that is associated with the online auction item. Alternatively, the pre-final status announcement advertisement is a general advertisement that is associated with a mass marketing campaign. Ads may be targeted to a user based on demographics and/or past interaction/purchasing history. For example, if a user is in a specific zip code/exchange area, AND/OR user has a history of purchasing home furnishings, the advertisement is related to home furnishings, even though the specific auction at the time might be for shoes.

In still another particular embodiment, the audio interface includes a final status announcement and the final status announcement indicates whether the user won or lost the auction of the online auction item. The final status announcement can further indicate the final bid for the online auction item.

In another particular embodiment, the audio interface includes a post-final status announcement advertisement. The post-final status announcement advertisement includes information that is associated with an item that is similar to the online auction item. Alternatively, the post-final status announcement advertisement includes information that is associated with an item that is related to the online auction item.

In yet another particular embodiment, the audio interface includes a second user action prompt that is communicated after the post-final status announcement. The second user action prompt is a prompt to perform at least one of the following actions: submit a bid, submit a maximum bid, purchase an item, place an item on a watch list, and place an item on a wish list. Users may opt to take action at a future time, i.e. "I call dibs" on an item (pending further review back at the PC), opt-in to have information on that item or service delivered via email/sms/IM/added to their online account for further review and/or action. Users may opt for "LIVE TRANSFER" to another company in response to an ad. For example, if they're bidding on a car, and win, a targeted ad for auto financing is generated, and the user can "press 1 to speak to Wells Fargo" about financing that car purchase.

In another embodiment, a method of contacting a user about an item that is available via an auction website is disclosed and includes establishing a telephone call over a voice channel to the user, authenticating the user, communicating an auction announcement to the user over the voice channel, communicating a current bid to the user over the voice channel, indicating whether the user is a high bidder for the item, and communicating one or more advertisements to the user over the voice channel.

In yet another embodiment, a method of advertising to a user that is bidding on a first item at an online auction is disclosed and includes contacting the user via a voice channel during an online auction of the first item, authenticating the user, and communicating at least one audio advertisement to the user via the voice channel before the online auction ends.

In still another embodiment, a system for notifying a user over a voice channel with respect to an item at an auction website is disclosed and includes a voice generation module that includes a first voice message. The first voice message includes a greeting, a reason for a call, and a prompt for a personal identification number. The reason for the call relates to the item at the auction website. The system further includes an advertising module that includes at least one audio advertisement.

In yet still another embodiment, a collection of human audible messages is disclosed and includes a human audible announcement that includes information associated with an online auction item. The collection of human audible messages also includes a human audible authorization prompt and a human audible advertisement.

In another embodiment, a communication link to communicate audio information is disclosed. The audio information includes a first audio message that includes a human audible announcement identifying an online auction item, a second audio message that includes a human audible authorization prompt to seek user identity information, and a third audio message that includes at least one human audible advertisement.

In still yet another embodiment, a method is disclosed and includes receiving a first signal that includes an announcement associated with an online auction item, combining at least one audio advertisement and the first signal to produce a combined signal, and communicating the combined signal over a voice channel.

In yet another embodiment, a method of advertising is disclosed and includes generating a telephone call. The telephone call includes an audible announcement associated with an online auction item and an audio advertisement insertion window. The method further includes inserting an audio advertisement into the audio advertisement insertion window.

In another embodiment, a data signal is disclosed and includes a first digital signal that represents a human audible announcement. The human audible announcement includes audio information associated with an online auction item. The data signal also includes a second digital signal that represents a human audible authorization prompt and a third digital signal that represents at least one human audible advertisement. At least one of the first digital signal, the second digital signal, and the third digital signal is stored in a computer readable memory.

In still another embodiment, a communication device is disclosed and includes an audio generator. The audio generator is configured to provide audio information associated with an online auction. The audio information further includes an authorization prompt and an audio advertisement.

Referring to FIG. 1, a system of facilitating e-commerce is shown and is designated 100. As shown, the system 100 includes a monitoring system 102 that communicates with a vender server 104 via the Internet 106. Further, the monitoring system 102 communicates with a voice over Internet protocol (VoIP) server 108 via the network 106. In a particular embodiment, a user telephone 110 is coupled to the monitoring system 102 via the Internet 106. Further, the user telephone 110 can be coupled to the Internet 106 via a telephone network 111, e.g., a public switched telephone network (PSTN) or a wireless telephone network, such as global system for mobile communication (GSM) network.

In a particular embodiment, the vender server 104 can be an e-commerce server that offers goods for sale with fixed pricing or escalating pricing based on an auction format. As shown, the vender server 104 can include a processor 112 and a memory 114 coupled to the processor 112. In a particular embodiment, one or more software applications or modules may be embedded within the memory 114 of the vender server 104. For example, the vender server 104 can include a vender interface module 116 embedded within the memory 114. The vender interface module 116 can provide connectivity with the vender server 104, e.g., via the Internet 106. In an illustrative embodiment, the vender server 104 also includes a user history/watch list module 118 than can be used to track the shopping or bidding history of one or more users and items that one or more user are seeking to purchase.

As shown in FIG. 1, the vender server 104 can further include an inventory module 120 that can be used to track the inventory provided for sale via the vender server 104. Further, the vender server 104 can include a cross sell/up sell module 122 that can be used to increase the sales provided by the vender server 104. For example, when a user purchases a particular item, the cross sell/up sell module 122 can recognize related items that may be useful to the user and offer those related items to the user for sale in conjunction with a purchased item. FIG. 1 also shows that the vender server 104 can include a transaction processing module 124 for processing transactions with the vender server 104.

As depicted in FIG. 1, the VoIP server 108 can include a processor 126 and a memory 128 that is accessible to the processor 126. In a particular embodiment, one or more software applications or modules may be embedded within the memory 128 of the VoIP server 108. For example, as shown, an outbound calling capacity module 130 can be embedded within the memory. In a particular embodiment, the outbound calling capacity module 130 can determine the number of outbound calls that the VoIP server 108 is capable of establishing at any given time. FIG. 1 also indicates that the VoIP server 108 can include a direct inward dialing (DID) availability module 132 that is embedded within the memory 128 of the VoIP server 108. In an illustrative embodiment, the DID availability module 132 can determine whether direct inward dialing is available for a particular user and if so, a DID service can be use to identify a called party, e.g., by using DTMF or other signaling means, before connecting a call to a called party.

FIG. 1 illustrates that the monitoring system 102 includes a web server 134, a call server 136, and a voice mail notification server 138. Additionally, the monitoring system 102 includes a user account database 140, a user history database 142, and a caller rules database 144. Each of the databases 140, 142, 144 can be coupled to one or more of the servers 134, 136, 138 within the monitoring system 102. FIG. 1 also indicates that the monitoring system 102 can includes a data mining server 146 that can be coupled to the databases 140, 142, 144. Additionally, an account server 147 can be coupled to the call server 136.

In a non-limiting, exemplary embodiment, the web server 134 includes a processor 148 and a computer readable medium, e.g., a memory 150, that is accessible to the processor 148. In a particular embodiment, one or more software applications or modules may be embedded within the memory 150 of the web server 134. For example, an account registration module 152 and an account management module 154 can be embedded within the memory 150 of the web server 134. In a particular embodiment, the modules 152, 154 can be used to allow one or more users to establish user accounts with the monitoring system 102. Further, the modules 152, 154 can be used to allow users to configure multiple user accounts on a per-vender basis and configure one or more notification events, or trigger events, on a per-vender basis.

Additionally, in a particular embodiment, the modules 152, 154 can be used to allow one or more users to update contact information, or notification information, previously input to the monitoring system. The contact information can include alternate numbers at which a user can be reached, e.g., a home telephone number, a work telephone number, and a mobile telephone number. Also, in a particular embodiment, the modules 152, 154 can allow users to configure call security settings for the user accounts, e.g., the modules 152, 154 can allow each user to establish a personal identification number (PIN) with the system and each user can be prompted to input a PIN when contacted by the monitoring system 102.

As illustrated in FIG. 1, the call server 136 within the monitoring system 102 can include a processor 156 and a computer readable medium, e.g., a memory 158, that is accessible to the processor 156. In a particular embodiment, one or more software applications or modules may be embedded within the memory 158 of the call server 136. For example, an inbound/outbound dialing event management module 160 may be embedded within the memory 158. Also, a DTMF event recognition module 162 may be embedded within the memory 158. Further, a caller authentication module 164 may be embedded within the memory 158. FIG. 1 also shows that an interactive voice response (IVR) module 165 can be embedded within the memory 158. 20. In an alternative embodiment, the caller authentication module may be part of a third party identification verification system.

In a particular embodiment, the inbound/outbound dialing event management module 160 within the call server 136 can operate in order to establish calls to users when notification events are detected. Further, the DTMF event recognition module 162 can be used to handle DTMF recognition of input received from a user device, e.g., a telephone with touch-tone capabilities. Moreover, the caller authentication module 164 can interact with other components within the monitoring system, e.g., the user account database 140, in order to provide security validation such as telephone number verification or PIN verification. Additionally, the modules 160, 162, 164 within the call server 136 can operate with other components within the monitoring system 102 in order to handle one or more user sessions at the vender websites.

As depicted in FIG. 1, the voice mail notification server 138 can include a processor 166 and a computer readable medium, e.g., a memory 168, that is accessible to the processor 166. In a particular embodiment, one or more software applications or modules may be embedded within the memory 168 of the voice mail notification server 138. For example, a voice mail notification event handling module 170 can be embedded within the memory 168. Moreover, a voice mail storage module 172 can be embedded within the memory 168. A GSM to MPEG layer-3 (MP3) conversion module 174 can also be embedded within the memory 168.

In a particular embodiment, the voice mail notification event handling module 170 handles the distribution of non-live audio notifications, e.g., to voice mail systems. Further, the GSM to MP3 conversion module 174 can be used to convert GSM audio files to MP3 audio files. Additionally, the voice mail storage module 172 can be used to store various audio notifications that can be broadcast to users that are registered with the monitoring system 102.

In an exemplary, non-limiting embodiment, the account server 147 interacts with the call server 136 and a commerce interface 173. In a particular embodiment, the account server 147 can act as a "virtual user" for the vender websites when a registered user has been authenticated by the call server 136. Further, the account server 147 receives DTMF inputs, e.g., from a user via the call server 136, and translates the DTMF inputs to outbound Web events on a per vendor basis. For example, a user may press a "1" at a keypad of the user telephone and the account server can translate that response to an instruction to an auction website to increase a bid by one increment. Additionally, the account server 147 receives inputs from the vender websites and translates the inputs into audible phone events. Also, the account server 147 can translate the inputs into audible menus that can be broadcast to a registered user.

The commerce interface 173 may be implemented as an application programming interface (API) that can interact with the account server 147 and the vender interface module 116 at the vender server 104 in order to receive data representative of purchasing events and bidding events.

As illustrated in FIG. 1, the user account database 140 can include user registration data 176, watch list data 178, and site specific credentials 180. Also, as shown in FIG. 1, the user history database 142 can include transaction history data 182, historical price data 184, and historical availability data 186. The caller rules database 144 can include one or more event triggers 188, i.e., notification events. For example, the notification events can include the offer for sale of a particular item at a particular vendor website at a target price or the imminent end of an auction for a sought after item that a user has placed a bid.

In a particular embodiment, the caller rules database 144 can also include one or more contact rules 190 and one or more caller rules 192. The contact rules 190 can indicate the manner in which a registered user is to be contacted and a user defined order of calling a plurality of different contact numbers for the user. Further, the caller rules 192 can include user defined rules that will always control the action of the monitoring system when acting as a "virtual user." For example, when a particular item is offered for sale, the user can specify for the monitoring system to automatically purchase the item at the asking price. Thereafter, the monitoring system can contact the user to indicate that the item has been purchased. In an alternative embodiment, the data provided by the databases 140, 142, 144 can be stored in a single database that is accessible to one or more of the other components within the monitoring system 102.

Each of the servers described above is a processing element that can be a server, as described, or a process. Further, any number or combination of the modules described above can be stored and executed within a single processing element or multiple processing elements in communication with each other.

Figure 2:
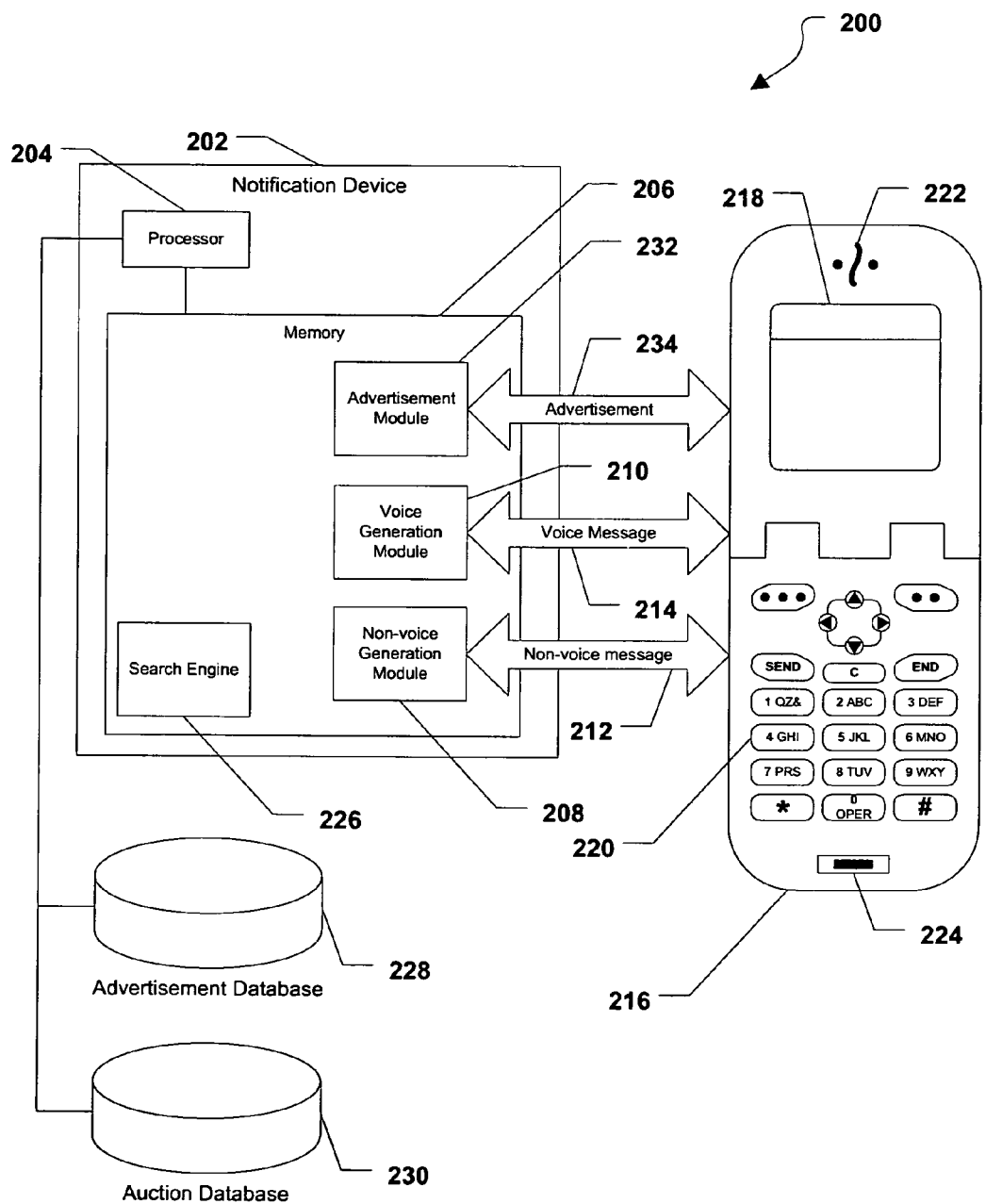
FIG. 2 is a block diagram representing a system of contacting a user over a voice channel about an item available for sale at a vendor website.

FIG. 2 illustrates a system, designated 200, of contacting a user over a voice channel about an item available for sale at a vendor website. As shown, the system 200 includes a notification device 202 that includes a processor 204 and a memory 206 that is accessible to the processor 204. Further, a non-voice generation module 208 and a voice generation module 210 are embedded within the memory 206.

In a particular embodiment, the notification device 202 communicates a non-voice message 212 and a voice message 214 to a communication device 216, e.g., a wireless telephone. Additionally, in a particular embodiment, the non-voice generation module 208 generates the non-voice message 212 that is communicated to the communication device 216. Also, in a particular embodiment, the voice generation module 210 generates the voice message 214 that is communicated to the communication device 216. In a particular embodiment, the voice generation module 210 can generate and transmit a first voice message, a second voice message, a third voice message, etc.

Table 1 includes a plurality of exemplary voice messages that may be communicated to the communication device 216 by the voice generation module 210. As shown, the messages are numbered, but the messages are not necessarily played in the order shown.

TABLE 1

Exemplary Voice messages.

| Message | Description |
| --- | --- |
| This is <service provider> calling about your <auction provider> auction status. Please enter your four digit PIN number now. | Played when user first contacted by service provider. |
| Your PIN number is incorrect. Please try again or press star and your PIN number will be mailed to your email address. | Played when an incorrect PIN is received. |
| Your PIN did not match. Please try again. | Played when an erroneous or non-matching PIN is received. |
| You can now bid on auction number <auction number> in the sub-category <sub-category name> of category <category name>. | Played when a correct PIN is received. |
| The current high bid is <current bid>. | Played after auction announcement and whenever an item price changes. |
| You are currently the high bidder. | Played when user is high bidder. |
| You are currently not the high bidder. | Played when user is not the high bidder. |
| To place a bid using <service provider>, press star. | Played when user is not the high bidder. |
| The current price is <current price>. | Played after auction announcement and whenever an item price changes. |
| There is <time remaining> left in the auction. | Played periodically when audio, e.g., when audio is idle. |
| To enter a minimum bid of <minimum bid> press # now. | Played when user is not the high bidder. |
| To enter a maximum bid, enter the amount in dollars and cents, and then press #. | Played when user is high bidder or when user is not the high bidder. |
| Your bid is less than the current minimum bid. | Played when a user's bid is less than the current high bid. |
| You have entered a bid of <bid amount>. To confirm your bid, press 1. To enter a different bid amount, press 2. To cancel this bid press star. | Played when a user's bid is higher than the current high bid. |
| Congratulations! Your bid placed through <service name> was successful. | Played when the bid is accepted by the auction provider and the bid is the highest bid. |
| We're sorry. The price has changed. | Played when the bid is not accepted. |
| Your bid was placed successfully, but you have been outbid. | Played when the auction provider accepts the bid, but the bid is not the highest bid. |
| To hear your current max bid, press 2. To get the current price for this auction, press 3. To hear the time left in this auction, press 4. To get the category for this auction, press 5. To hear these options again, press 9. | Played at the user's request, after the initial bid information, and when the system is idle |

TABLE 1-continued

Exemplary Voice messages.

| Message | Description |
| --- | --- |
| | for a predetermined time period. |
| You have pressed an invalid key. | Played when an invalid entry is received from the user. |
| We're sorry. This auction has ended early. Please check <auction provider> for more details. | Played if the auction ends early, e.g., auction cancelled or item bought using a "buy it now" option. |
| Your current max bid is <current max bid>. | Played at the user's request. |
| You have cancelled your bid. | Played after the user presses *. |
| We're sorry. We are unable to communicate with <auction provider>. | Played after a failed bid attempt, a failed sign in, a failed offer, or a failed confirm. |
| Please try again. | Played after a failed bid attempt, a failed sign in, a failed offer, or a failed confirm. |
| We're sorry. Your PIN is correct, but the <auction provider> username and password associated with your account must be updated, please log into your account at <service provider> to update your information. Thank you. | Played after a failed sign in. |
| We're sorry. This auction ended before your bid was submitted. Thank you for using <service provider>. | Played when a bid is confirmed, but the auction has ended. |
| You have not yet bid on this item. | Played when a user requests a bid status, but the user has not bid in the item. |
| Placing bid. Please hold while we attempt to place your bid with <auction provider>. | Played when a bid is confirmed by the service provider. |
| The auction has ended. | Played when an auction ends. |
| You have won the auction. Please check your email for information from <auction provider> on completing this transaction. | Played when a user wins an auction. |
| You did not win this auction. Better luck next time. | Played when the user does not win an auction. |
| Please note: You can skip ahead if you know your selection. Audio prompts can be interrupted at any time. | Played when the system is idle. |
| Updating auction status. Please hold while we verify the close of this auction with <auction provider>. | Played while verifying that an auction has ended. |

As depicted in FIG. 2, the communication device 216 includes a display 218, a keypad 220, a speaker 222, and a microphone 224. In a particular embodiment, the communication device 216 can receive the non-voice message 212 and the voice message 214 from the notification device 202 and broadcast, or communicate, the non-voice message 212 and the voice message 214 to a user via the speaker 222. The non-voice message 212 can be broadcast in the background of the voice message 214. For example, the non-voice message 212 can be a low pulsing tone that slowly increases in frequency, volume, and/or pitch while the voice message 214 is broadcast to the user. In a particular embodiment, the pulsing of the non-voice message 212 indicates a countdown of time, e.g., the time remaining to purchase an item via an auction website.

A user can respond to the voice message 214 by speaking a command into the microphone 224 or by toggling a button on the keypad 220 that corresponds to a menu option presented by the voice message 214. Accordingly, the notification device 202 can communicate the status of an item that is available at a vendor website to a user via the communication device 216. Further, a user can take action with respect to the item by inputting a command via the keypad 220 or the keypad 224.

In a particular embodiment, the system 200 can also provide the user with a tutorial in order to teach the user how to interact with the system 200 during an auction for an item. The tutorial can simulate an auction and allow a user to bid on an imaginary item. Table 2 includes a plurality of voice messages that can be communicated to a user during the tutorial.

TABLE 2

Exemplary Tutorial Voice Messages.

Tutorial Message
This is <service provider> calling with an interactive tutorial for your new
auction service. Please enter your four digit PIN now to continue.
If you have previously used this tutorial, press the * key during the tutorial to
skip straight to the interactive bidding simulation. Otherwise, please listen
carefully for instructions on getting the most out of <service provider>.
After each section of the tutorial, you will have the option to continue on with
the tutorial by pressing 1, or repeat the previous instructions by pressing 2.
Again, you can skip the tutorial instructions at any time and get right to the
bidding simulation by pressing *.
System Overview: <service provider>'s interactive auction system has two
modes. Status mode and bidding mode.
At the beginning of every call, you will be in status mode. You will hear the
auction category, current price, if you're high bidder or not, and the time left in the auction.
You will also be given a list of optional commands that can be entered in this
menu to retrieve your max bid, current price, auction status, and time left in
auction.
If you do not press a key, you will receive regular updates of the time left in the
auction, the current item price, and your bid status.
After all the menus in the Status mode have been played one time, the system
may interrupt them with real-time price and status updates from <auction provider>.
You can press * to bid at any time when in Status Mode. By pressing star, you
exit the Status mode, and enter <service provider>'s Bidding Mode.
At any time, you may "exit out" of the Bidding Mode by pressing * again.
While in Bidding Mode, you may enter a max price you wish to pay for an item,
followed by # to submit your selection, or you may simply press # to
automatically submit a minimum bid.
After entering either a max or minimum bid, you will be prompted to confirm
your selection by Pressing 1. Pressing 2 will allow you to re-enter the amount
you wish to bid.
After pressing 1 to confirm your bid, <service provider> submits your bid to
<auction provider>.
If your bid was successful, you will automatically return to the Status mode,
where you will be updated of price changes, and the time left in the auction.
Press * to bid again at any time.
If your bid was unsuccessful, or if you were immediately outbid, you will be
returned to the bid menu, and have the option to immediately re-bid.
Please use this tutorial as often as you like. It's important that you feel
completely comfortable when you bid on your real auctions. After only a few
bid simulations, you will find that bidding on <auction provider> with <service
provider> is the easiest way to win your auctions when you're away from the
computer!
You will now have the opportunity to bid on a simulated Auction. You will
have 3 minutes to try and win this item. This is a simulation only. This is not a
real Auction.
Press 1 to continue with the tutorial. Press 2 to repeat the section of instructions
you just heard.

FIG. 2 also shows that the notification device 202 includes a search engine 226 that is embedded within the memory 206. In a particular embodiment, the search engine 226 can be used to perform a search with an advertisement database 228 and an auction database 230 that are coupled to the processor 204. The advertisement database 228 can include a plurality of advertisements. In a particular embodiment, the advertisement database 228 can be keyword searched in order to find advertisements to transmit to a user. Additionally, the auction database 230 can include a plurality of items that are for sale at an auction website. The search engine 226 can be used to search the auction database 230 in order to determine if a particular item is for sale and transmit information, e.g., in the form of an advertisement, to the user. Either search can be performed based on an item that a user is currently bidding on or an item associated with a user watch list. Alternatively, the searches can be performed based on an item associated with a user wish list.

As shown in FIG. 2, the notification device 202 includes an advertisement module 232 that is embedded with the memory 206. In a particular embodiment, the advertisement module 232 communicates one or more advertisements 234 to the communication device 216. The advertisements can be audio advertisements, video advertisements, video advertisements with audio, still image advertisements, and still image advertisements with audio. In a particular embodiment, a telephone call can be placed to the communication device 216. Further, in a particular embodiment, the telephone call can include one or more advertisement insertion windows. The advertisement module can retrieve advertisements from the advertisement database 228 and insert an advertisement into each advertisement insertion window.

As illustrated in FIG. 2, the advertisement module 232 is located within the notification device 202. However, in an alternative embodiment, the advertisement module 232 can be located at a router through which a telephone call to the communication device 216 is switched. As such, when the router receives a call that is directed to the communication device 216, the advertisement module 232 can insert advertisements into the telephone call, e.g., into the advertisement insertion windows established within the telephone call.

Figure 9:
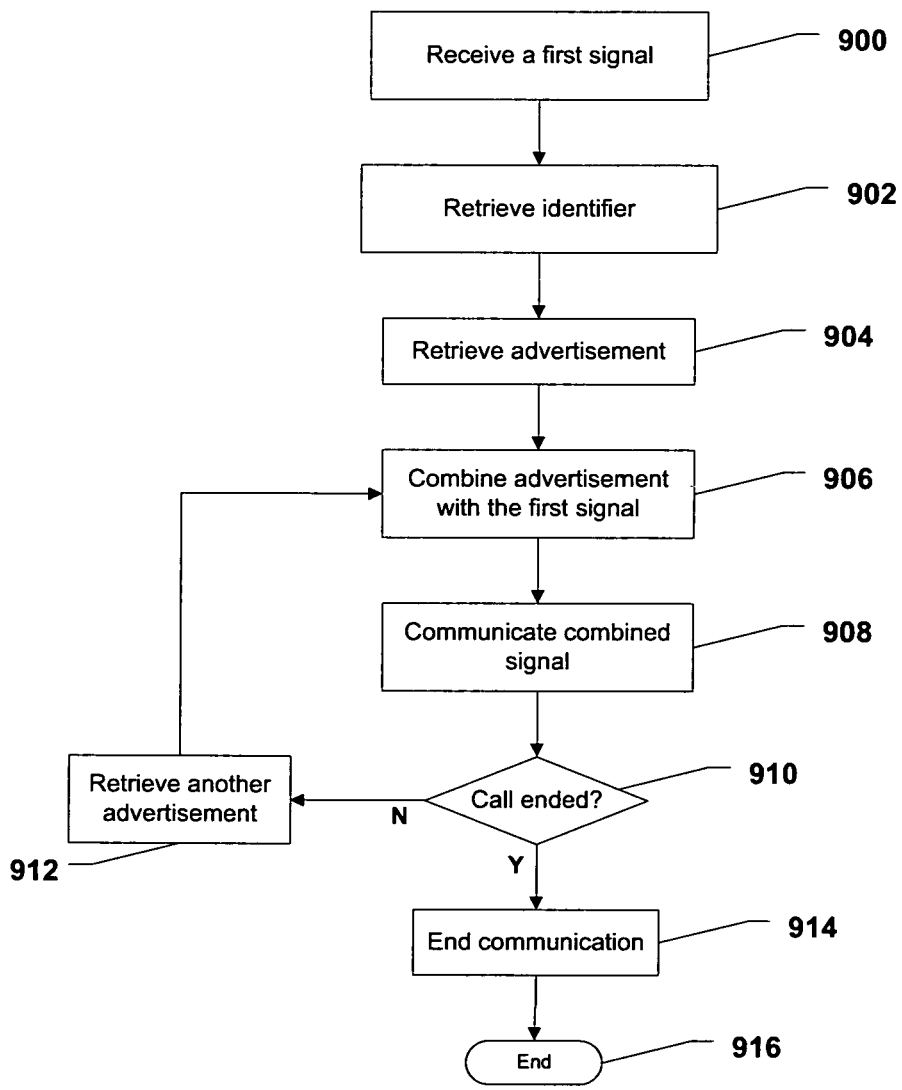
FIG. 9 is a flow charting illustrating a method of inserting advertisements into a telephone call.

In a particular embodiment, the voice generation module 210, the non-voice generation module 212, and the advertisement module 232 can be used to create an audio interface that is communicated to the communication device 216. The audio interface can be a telephone call that includes one or more announcements, one or more user prompts, one or more status updates, and one or more advertisements. FIG. 9, described in detail below, illustrates a telephone call that includes an audio interface.

Figure 3:
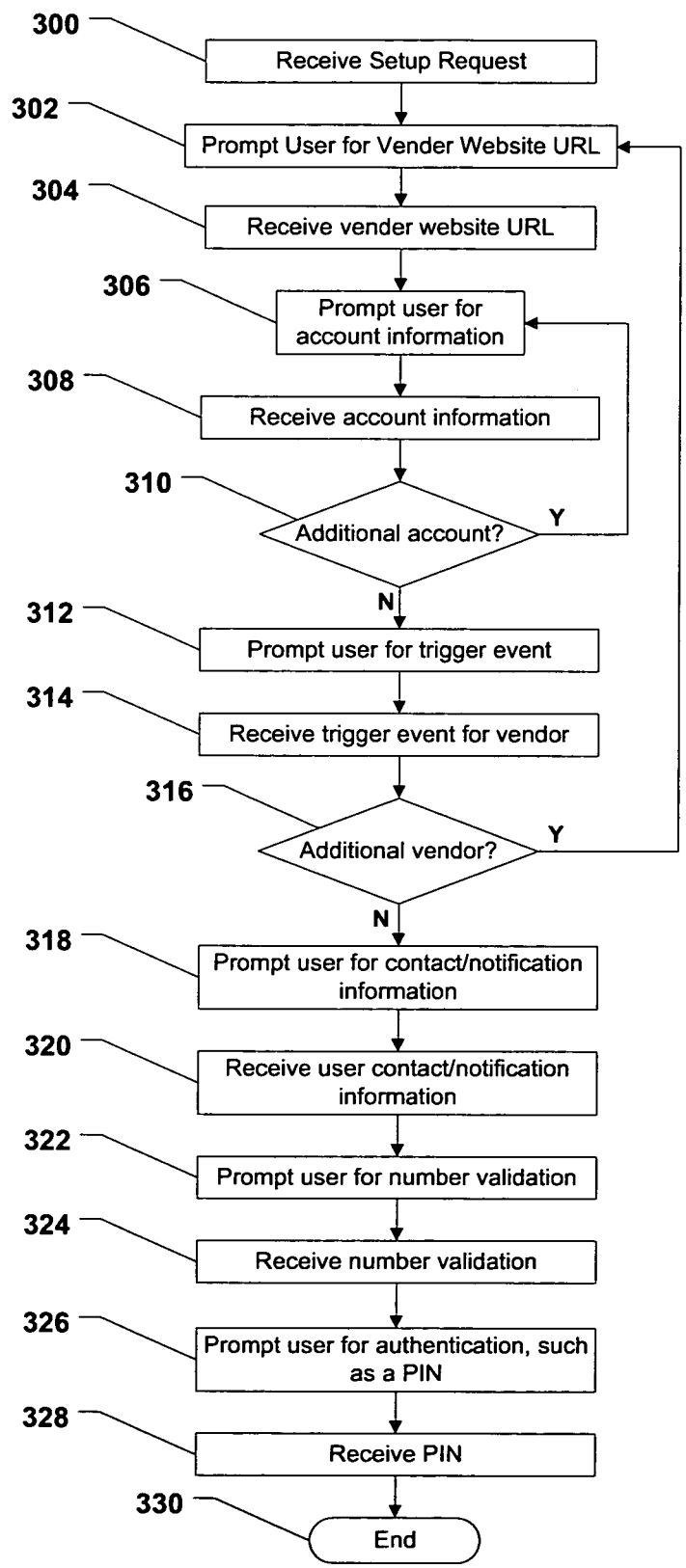
FIG. 3 is a flow chart illustrating a method of establishing a user account with a vender website monitoring system.

Referring to FIG. 3, a method of configuring a user account at the monitoring system is shown and commences at block 300. At block 300, the monitoring system receives a set up request from a user. At block 302, the user is prompted for a vendor website (URL). Moving to block 304, the monitoring system receives the vendor website URL from the user.

At block 306, the monitoring system prompts the user for account information, e.g., information concerning the user account with the vendor website. In a particular embodiment, the user account information can include a user account name, a user account number, and a user password. Moving to block 308, the system receives the user account information. Thereafter, at decision step 310, the system prompts the user to determine whether the user has an additional account with the vendor website. If so, the method returns to block 306 and continues as described.

If the user does not have an additional account with the vendor website, the method proceeds to block 312 and the user is prompted for a trigger event. In a particular embodiment, the trigger event can be a particular online auction for a particular item. Further, in a particular embodiment, the trigger event can be the release of a particular item, e.g., concert tickets, at a vendor website. Further, the trigger event can be a price decrease of a particular item, the release of a new book, the release of a new compact disk, etc. At block 314, the system receives the trigger event for the vendor.

Continuing to decision step 316, the system prompts the user to determine whether the user wishes to set up an account with another vendor. If the user indicates that the user would like to set up an account with another vendor, the method returns to block 302 and continues as described. If the user indicates that the user does not want to set up an account with another vendor, the method proceeds to block 318 and the system prompts the user for contact information or notification information. In a particular embodiment, the contact information or notification information can include a telephone number, e.g., a cellular telephone number, a mobile telephone number, or a public switched telephone network (PSTN) telephone number. At block 320, the system receives the user contact information or notification information.

Proceeding to block 322, the system prompts the user for number validation. At block 324, the system receives the number validation from the user. Next, at block 326, the system can prompt the user for an authentication, e.g., a personal identification number (PIN), that can be associated with the user account at the monitoring system. At block 328, the system receives the PIN from the user. The method then ends at state 330. Accordingly, the method described above can be used by a user to register with the monitoring system. Further, based on the information input to the monitoring system the user can be alerted when any of the trigger events input to the monitoring system occur at one or more vendor websites.

Figure 4:
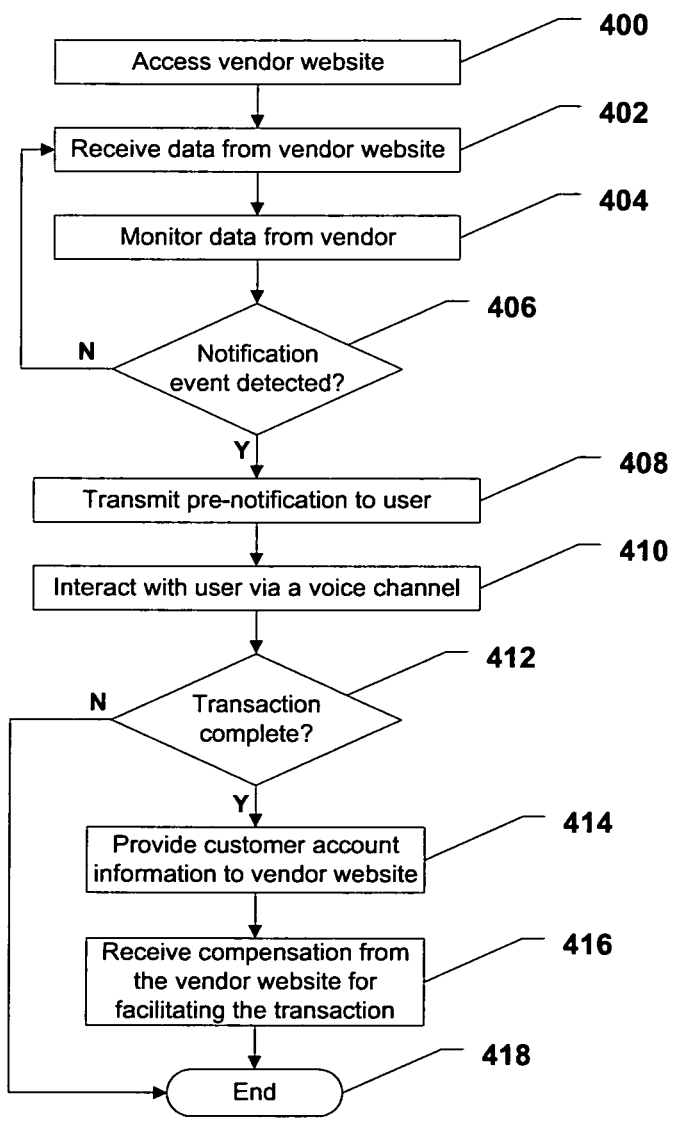
FIG. 4 is a flow chart illustrating a general method of monitoring a vender website.

Referring to FIG. 4, a method of monitoring a vendor website for a trigger event is shown. Beginning at block 400, the monitoring system accesses the vendor website, e.g., via the Internet. At block 402, the monitoring system receives data from the vendor website. Next, at block 404, the monitoring system monitors the data from the vendor website. Moving to decision step 406, the monitoring system determines whether a notification event is detected based on the data received from the vendor website. If a notification event is not detected, the method returns to block 402 and continues as described herein. In a particular embodiment, the monitoring system can detect a notification event by monitoring the data received from the vender website for one or more of the triggers input by the user, e.g., a imminent end of an auction and a price decrease of a product.

On the other hand, if a notification event is detected, the method proceeds to block 408 and the monitoring system communicates a pre-notification message to the user. Next, at block 410 the monitoring system interacts with a user via a voice channel. In a particular embodiment, the pre-notification message can be sent to the user a predetermined time before the interaction with the user, e.g., thirty minutes prior to the interaction. Additionally, the pre-notification message can be sent to the user via a short messaging system (SMS), an email system, or an alphanumeric paging system. Also, in a particular embodiment, the pre-notification message can include the exact time that the interaction with the user is scheduled, the subject of the interaction, and other relevant information, e.g., a bid status, an auction status, a time remaining for the auction, etc. Further, in an exemplary, non-limiting embodiment, the interaction with the user can be facilitated using an interactive voice response (IVR) module at the monitoring system.

Figure 5:
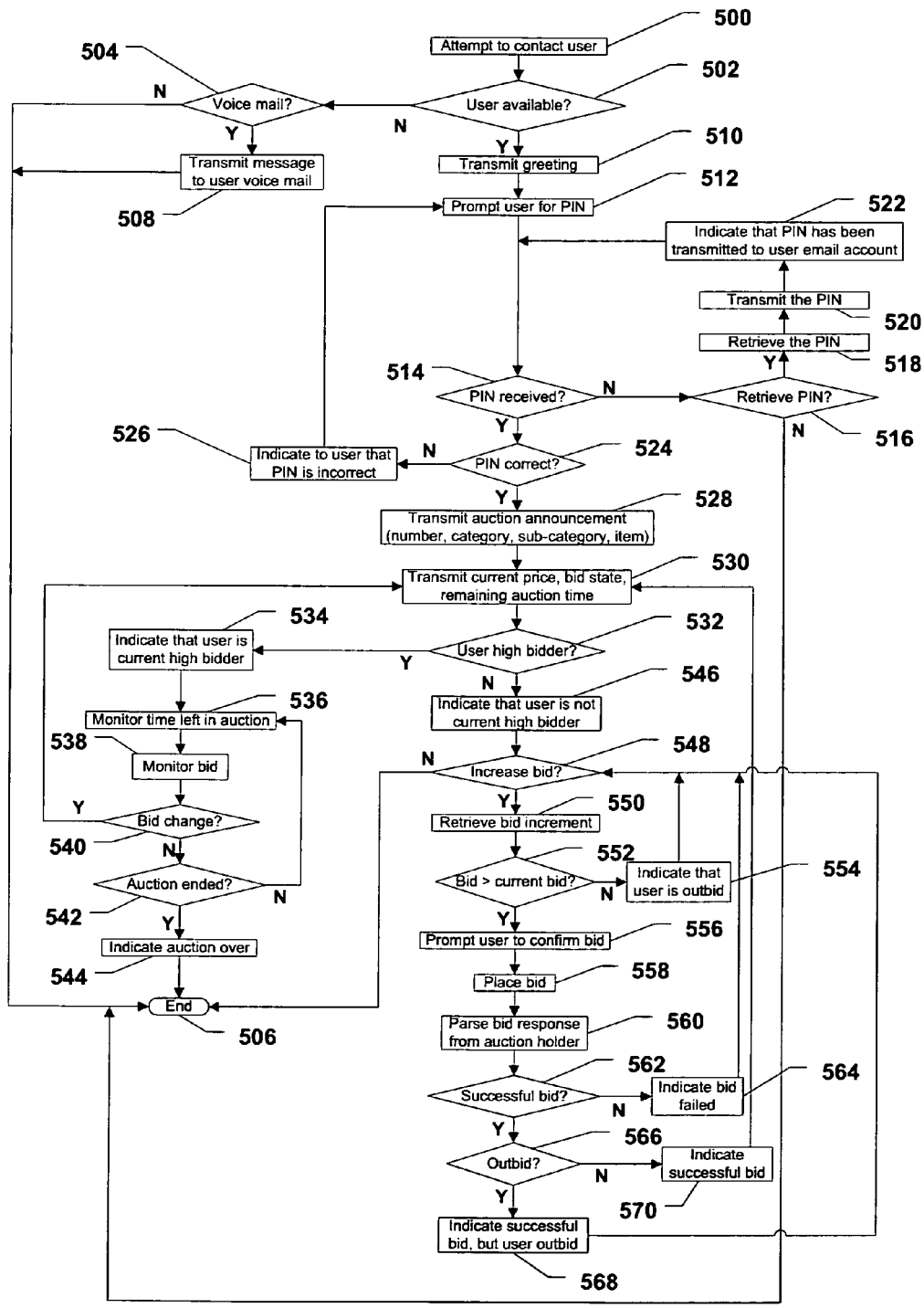
FIG. 5 is a flow chart illustrating a detailed method of contacting a registered user about an auction website.
Figure 6:
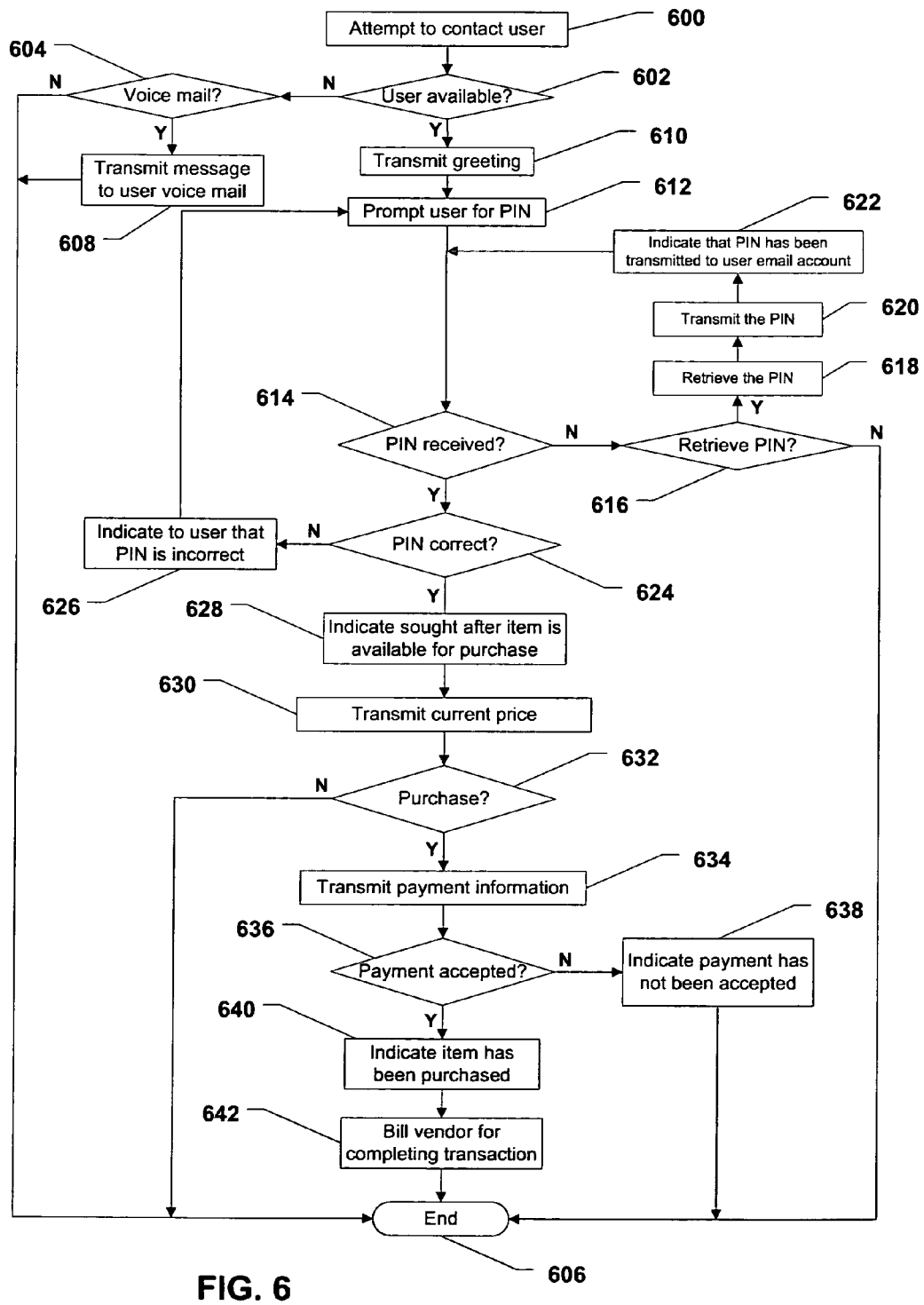
FIG. 6 is a flow chart illustrating a detailed method of contacting a registered user about an e-commerce website.

FIG. 5 depicts an exemplary method of interacting with a user that is registered with an auction website. FIG. 6 depicts an exemplary method of interacting with a user that is registered with an e-commerce website offering products for sale at set pricing.

Returning to FIG. 4, at decision step 412, the monitoring system determines whether the transaction has been completed, e.g., whether the user has purchased an item associated with the notification event or whether an auction associated with the notification event has ended. If the transaction is completed, the method proceeds to block 414 and the monitoring system provides customer account information to the vendor website. In a particular embodiment, the account information can include a login identification and a password. Further, in a particular embodiment, the account information can include an affiliate identification, which can be used to track successful bids and successful transactions. In another embodiment, the account information can include billing information, e.g., an account number, a credit card number, etc.

At block 416, the monitoring system receives compensation from the vendor website for facilitating the transaction. The method then ends at state 418. In a particular embodiment, the monitoring system can be compensated via an affiliate program associated with the vendor website. For example, an affiliate program identification can be tracked and the monitoring system can be credited for transactions. Additionally, in a particular embodiment, a transaction may include a completed purchase of an item. Alternatively, a transaction may include a successful bid for an item at an auction website. Returning to decision step 412, if the transaction is not completed, e.g., the user has decided not to purchase the item associated with the notification event, the method ends at state 418.

In a particular embodiment, the monitoring system can monitor the number of successful transactions and determine the rate at which successful transactions occur. As such, the monitoring system can further target particular users that are prone to completing transactions and purchasing goods. Further, the monitoring system can determine the percentage of total calls established that result in completed transactions that may be subject to billing to a vendor website. Alternatively, the monitoring system can determine the percentage of total calls that are compensated calls where the vendor website pays compensation either directly or through an affiliated payment plan in connection with user action made during the calls. In a particular embodiment, during operation, the percentage of total calls billed to one or more vendor websites is above a targeted percentage, e.g., ten percent, twenty percent, and fifty percent. The percentage of calls billed can be used to modify the monitoring system. For example, if the percentage of calls billed falls below the targeted percentage the monitoring system can modify the number of users that are called. Alternatively, the monitoring system can review the historical data for each user and only target those users that have a history of completing transactions via the monitoring system.

Referring to FIG. 5, a method of contacting a registered user regarding an auction website event is shown and commences at block 500. At block 500, the monitoring system attempts to contact a registered user over a voice channel, such as a cellular telephone. Next, at decision step 502, the monitoring system determines whether the user is available, i.e., has the user answered the telephone. If the user is not available, the method proceeds to decision step 504 and the monitoring system determines whether a voice mail system answers the call from the monitoring system. If not, the method ends at state 506. Otherwise, if a voice mail system answers the call from the monitoring system, the method continues to block 508 and the monitoring system communicates an audio message, e.g., an MP3 message, to the user voice mail. The method then ends at state 506.

Returning to decision step 502, when the user is available, the method proceeds to block 510 and the monitoring system communicates an audio greeting to the user 510. Thereafter, at step 512, the monitoring system prompts the user for a PIN in order to verify the user's identity. Proceeding to decision step 514, the monitoring system determines whether a PIN is received.

When a PIN is not received, the monitoring system prompts the user to determine whether the user would like the monitoring system to retrieve the PIN. If the user indicates that the user does not want the monitoring system to retrieve the PIN, the method ends at state 506. Conversely, when the user indicates to the monitoring system that the user does want the monitoring system to retrieve the PIN, the method proceeds to block 518 and the monitoring system retrieves the user PIN. Next, at block 520, the monitoring system communicates the user PIN to the user email account. At block 522, the monitoring system indicates that the PIN has been communicated to the user email account.

Returning to decision step 514, when a PIN is received from the user, the method proceeds to decision step 524 and the monitoring system determines whether the PIN is correct. If the PIN is incorrect, the method moves to block 526 and the monitoring system indicates to the user that the PIN is incorrect. The method then returns to block 512 and continues as described herein.

When a correct PIN is received at decision step 524, the method continues to block 528 and the monitoring system communicates an auction announcement to the user, e.g., by communicating an audio message to the user. In a particular embodiment, the auction announcement can include the number of the auction, the category of the auction, the sub-category of the auction, and the name of the item. Thereafter, at block 530, the monitoring system communicates the current price of the item, the current bid state, and the remaining auction time to the user. In a particular embodiment, the monitoring system can contact the user when the remaining auction time is less than ten minutes, e.g., six minutes, three minutes, etc. Further, in an alternative embodiment, a time remaining for the auction can be communicated to the user in response to the user inputting a request for the time remaining, e.g., using a keypad at a telephone. In another alternative embodiment, the time remaining can be dynamically injected into a phone session in order to give real-time updates concerning the time remaining for the auction or a quantity remaining for a particular item.

Moving to decision step 532, the monitoring website determines whether the user is the high bidder. If the user is the high bidder, the method continues to block 534 and the monitoring system indicates to the user that the user is the high bidder. At block 536, the monitoring system monitors the time remaining in the auction. Next, at block 538, the monitoring system monitors the bid. Proceeding to decision step 540, the monitoring system determines whether the bid has changed. If the bid changes, the method returns to block 530 and continues as described.

On the other hand, if the bid has not changed, the method moves to decision step 542 and the monitoring system determines whether the auction has ended. If the auction has not ended, the method returns to block 536 and continues as described herein. When the auction ends, the method moves to block 544 and the monitoring system indicates that the auction has ended. The method then ends at state 506.

Returning to decision step 532, if the user is not the high bidder, the method proceeds to block 546 and the monitoring system indicates that the user is not the high bidder. Next, at decision step 548, the monitoring system prompts the user to determine whether the user would like to increase his or her bid. If the user does not want to increase the bid, the method ends at state 506. When the user wants to increase the bid, the method moves to block 550 and the monitoring system retrieves the bid increment from the auction website. In a particular embodiment, the monitoring system can increase the user's bid to the user's maximum bid.

In a particular embodiment, the monitoring system determines real-time state information, such as high-bid status, through interaction with the auction website. For example, the time remaining for an auction can be managed at the auction website and the monitoring system can periodically poll the auction website in order to determine the time remaining.

Proceeding to decision step 552, the monitoring system determines whether the user's bid is greater than the current bid. If the user's bid is not greater than the current bid, the method proceeds to block 554 and the monitoring system indicates that the user is still outbid. The method returns to decision step 548 and continues as described. At decision step 552, when the user's bid is greater than the current bid, the method moves to block 556 and the monitoring system prompts the user to confirm the bid. Next, at block 558, the monitoring system places the bid for the user.

Continuing to block 560, the monitoring system parses a bid response received from the auction website. At decision step 562, the monitoring system determines whether the user's bid is successful. If the user's bid is not successful, the method proceeds to block 564 and the monitoring system indicates that the user's bid has failed. The method then returns to decision step 548 and continues as described herein.

At decision step 562, if the user's bid is successful, the method proceeds to decision step 566 and the monitoring system determines whether the user has been outbid. If the user is outbid, the method proceeds to block 568 and the monitoring system indicates to the user that the bid is successful, but the user has been outbid. The method then returns to decision step 548 and continues as described. Conversely, if the user is not outbid, the method proceeds to block 570 and the monitoring system indicates to the user that the user's bid was successful. Then, the method returns to block 530 and continues as described.

Referring to FIG. 6, a method of contacting a registered user about an e-commerce website is shown and commences at block 600. At block 600, the monitoring system attempts to contact a registered user via a telephone, e.g., a cellular telephone or a landline telephone. Next, at decision step 602, the monitoring system determines whether the user is available, i.e., has the user answered the call. If the user is not available, the method proceeds to decision step 604 and the monitoring system determines whether a voice mail system answers the call from the monitoring system. If not, the method ends at state 606. Otherwise, if a voice mail system answers the call from the monitoring system, the method continues to block 608 and the monitoring system communicates an audio message, e.g., an MP3 message, to the user voice mail. The method then ends at state 606.

Returning to decision step 602, when the user is available, the method proceeds to block 610 and the monitoring system communicates an audio greeting to the user 610. Thereafter, at step 612, the monitoring system prompts the user for a PIN in order to verify the user's identity. Proceeding to decision step 614, the monitoring system determines whether a PIN is received.

When a PIN is not received, the monitoring system prompts the user to determine whether the user would like the monitoring system to retrieve the PIN. If the user indicates that the user does not want the monitoring system to retrieve the PIN, the method ends at state 606. Conversely, when the user indicates to the monitoring system that the user does want the monitoring system to retrieve the PIN, the method proceeds to block 618 and the monitoring system retrieves the user PIN. Next, at block 620, the monitoring system communicates the user PIN to the user email account. At block 622, the monitoring system indicates that the PIN has been communicated to the user email account.

Returning to decision step 614, when a PIN is received from the user, the method proceeds to decision step 624 and the monitoring system determines whether the PIN is correct. If the PIN is incorrect, the method moves to block 626 and the monitoring system indicates to the user that the PIN is incorrect. The method then returns to block 612 and continues as described.

When a correct PIN is received at decision step 624, the method continues to block 628 and the monitoring system indicates that a sought after item, e.g., an item on a watch list or wish list established by the user with the monitoring system or the vendor website, is available for purchase or is at a target price desired by the user. Next, at block 630, the monitoring system communicates a current price to the user. In a particular embodiment, the monitoring system communicates with the user by communicating audio messages to the user. Moving to decision step 632, the monitoring system prompts the user in order to determine whether the user wants to purchase the sought after item. If the user does not want to purchase the sought after item, the method ends at state 606.

On the other hand, if the user indicates that the user wants to purchase the sought after item, the method proceeds to block 634 and the monitoring system communicates the user payment information, previously supplied to the monitoring system, to the vender website. Thereafter, at block 636, the monitoring system determines whether payment has been accepted by the vendor website. If payment is not accepted, the method proceeds to block 638 and the monitoring system indicates to the user that payment has not been accepted by the vendor website. The method then ends at state 606. In a particular embodiment, payment can be facilitated using previously stored payment data, e.g., using a "one click" shopping mechanism at the vendor website.

When payment is accepted, the method proceeds to block 640 and the monitoring system indicates to the user that the sought after item has been purchased. Proceeding to block 642, the monitoring system bills the vendor website for completing the transaction. The method then ends at state 606.

In one or more of the methods disclosed, a user is authenticated by inputting a PIN. However, the user can input one or more alternative authentication inputs. For example, the authentication input can be a biometric input, such as a voice input, a fingerprint scan, a palm scan, an iris scan, a retinal scan, facial mapping, infrared pattern matching, etc. Alternatively, the authentication can be performed using a physical token device, e.g., a passkey or a universal serial bus (USB) dongle.

Figure 7:
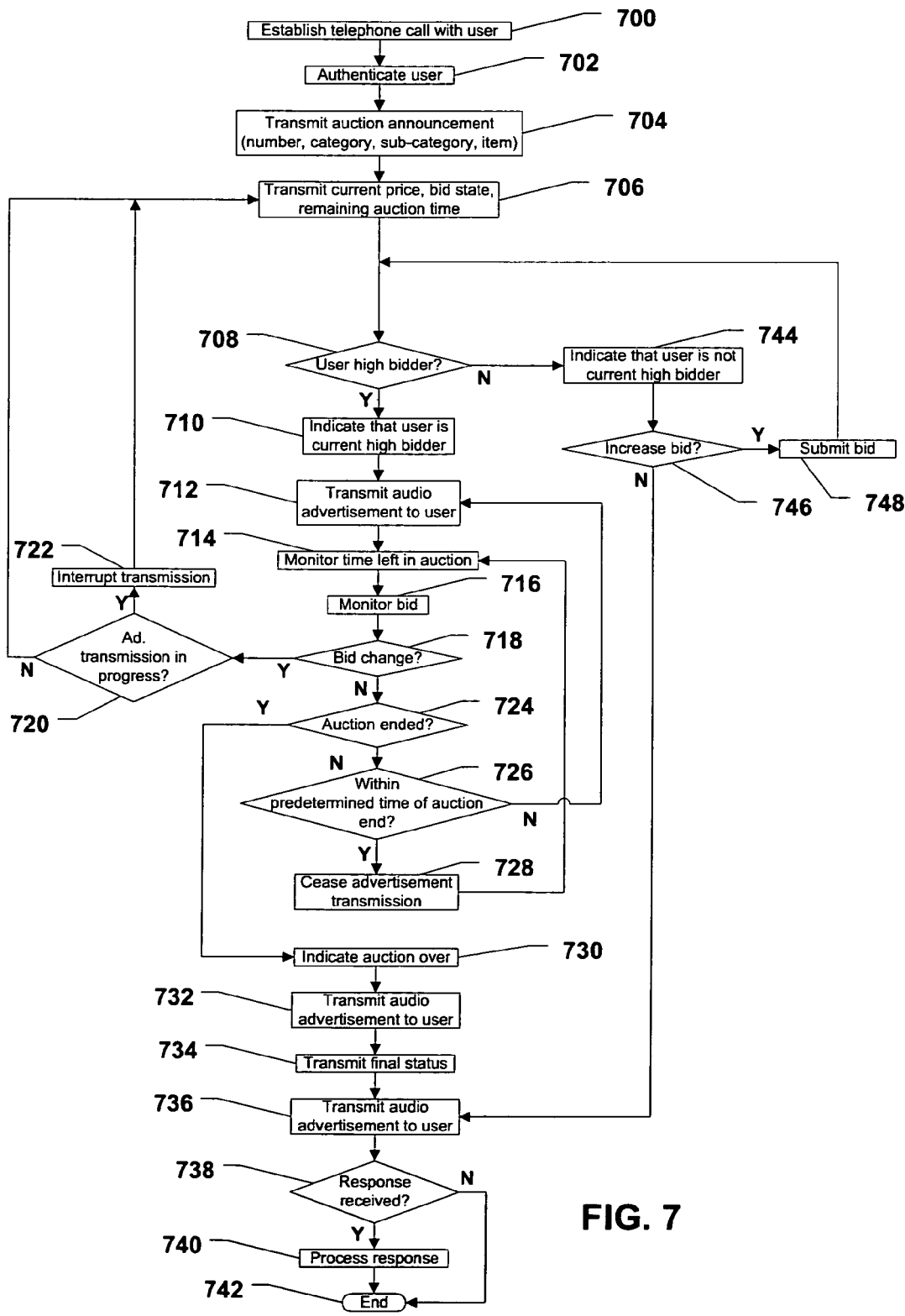
FIG. 7 is a flow chart illustrating a method of advertising.

Referring to FIG. 7, a method of advertising is illustrated and commences at block 700, where a system establishes a telephone call to a user. At block 702, the system authenticates the user, e.g., by prompting the user for a PIN and verifying that the PIN matches a PIN that is stored for the user. In an alternative embodiment, the system can authenticate the user using one or more of the other authentication inputs described herein.

Moving to block 704, the system communicates an auction announcement to the user. In a particular embodiment, the auction announcement can include one or more of the following: an auction number, an auction category, an auction sub-category, an item name, an item number, or other auction related information. At block 706, the system communicates a current price, a bid state, and a remaining auction time to the user.

Proceeding to decision step 708, the system determines whether the user is the current high bidder. If so, the method moves to block 710 and the system indicates that the user is a current high bidder. Thereafter, at block 712, the system communicates an advertisement to the user. In a particular embodiment, the system can include an advertisement module that inserts advertisements into the telephone call.

In a particular embodiment, the advertisement is an audio advertisement, i.e., an advertisement that includes audio. Further, the advertisement is a targeted advertisement, e.g., an advertisement that is targeted to a user based on the auction item that the user has submitted a bid on or an auction item that the user has placed on a watch list. For example, if the user is bidding on a set of golf clubs, the advertisement can be for a golfing vacation, a public golf course, or other golf related service or item. Alternatively, the advertisement is a general advertisement that is part of a mass marketing campaign. For example, the advertisement can be for a new wireless Internet service available via a cellular telephone or other wireless device. At block 714, the system monitors the time left in the auction. Further, at block 716, the system monitors the current high bid associated with the item.

Continuing to decision step 718, the system determines whether the current high bid has changed. When the current high bid changes, the method moves to decision step 720 and the system determines whether an advertisement transmission is in progress. If so, the method proceeds to block 722, and the system interrupts the transmission of the advertisement and the method returns to block 706 and continues as described. If an advertisement transmission is not in progress, the method returns directly to block 706 and continues as described to communicate the changed bid information.

Returning to decision step 718, if the current high bid has not changed, the method moves to decision step 724 and the system determines whether the auction has ended. If the auction has not ended, the method moves to decision step 726 and the system determines whether the current time is within a predetermined time of the end of the auction, e.g., three minutes, two minutes, one minute, etc. If not, the method returns to step 712 and continues. Conversely, if the current time is within the predetermined time of the end of the auction, the method moves to block 728 and the system ceases transmission of advertisements to the user. As such, the telephone call includes an advertisement-free time period in which advertisements are not communicated to the user. As an auction winds down, this may prevent a user from being distracted or missing a chance to increase a bid for an item. The method then returns to block 714 and continues as described.

In a particular embodiment, as long as the auction has not ended and as long as the advertisement-free time period has not begun, the system can continue to send advertisements to the user. For example, the system can send a first advertisement, a second advertisement, a third advertisement, and an Nth advertisement. Each of the advertisements can be different. Alternatively, the system can repeat the same advertisement one or more times.

Returning to decision step 724, when the auction ends, the method proceeds to block 730 and the system indicates to the user that the auction is over. Moving to block 732, the system communicates another advertisement to the user. In a particular embodiment, the advertisement an audio advertisement. Also, in a particular embodiment, the advertisement is a targeted advertisement, e.g., an advertisement that is targeted to the user based on the item that the user has submitted a bid or has placed on a watch list. Alternatively, the advertisement is a general advertisement that is party of a mass marketing campaign. At block 734, the system communicates a final status to the user. In a particular embodiment, the final status indicates whether the user has won or lost the auction. Proceeding to block 736, the system communicates yet another advertisement to the user.

In a particular embodiment, if the user wins the auction, the advertisement communicated at block 736 can be an advertisement for an item that is related to the item that the user has won. The related item may be available at the auction website, at another website, or through another retail channel. If the user does not win the auction, the advertisement communicated at block 736 may be an advertisement for an item that is similar to the item that the user did not win. The similar item can also be available at the auction website, at another website, or through another retail channel.

In a particular embodiment, the advertisements can be targeted based on the types of items for which users submit bids. As such, an advertising client can target goods or services directly to particular users. Further, the advertisement spots within a telephone call can be sold based on the types of customers that the advertising client is targeting.

At decision step 738, the system determines whether a response to the most recent advertisement is received. For example, if the advertisement is for another item that is up for auction at the auction website, the user can be prompted at the end of the advertisement to place the item on a watch list. Alternatively, the user can be prompted to purchase an item offered for sale in the advertisement. In either case, if a response is received from the user, the method moves to block 740 and the system processes the response. For example, the system can place an item on a watch list or forward a request to place an item on a watch list to an auction system. Additionally, the system can process a purchase request or forward a purchase request to an alternate system where it can be processed at a later time. The method then ends at state 742. At decision step 738, if a response is not received, the method moves directly to state 742 and ends.

Returning to decision step 708, if the user is not the high bidder, the method proceeds to block 744 and the system indicates that the user is not the current high bidder. Continuing to decision step 746, the system prompts the user to increase his or her bid. If the user does not want to increase the bid, the method moves to block and continues as illustrated in FIG. 7. On the other hand, if the user wants to increase the bid, the method proceeds to block 748 and the system submits the increased bid for the user. The method then returns to decision step 708 and continues as described.

Figure 8:
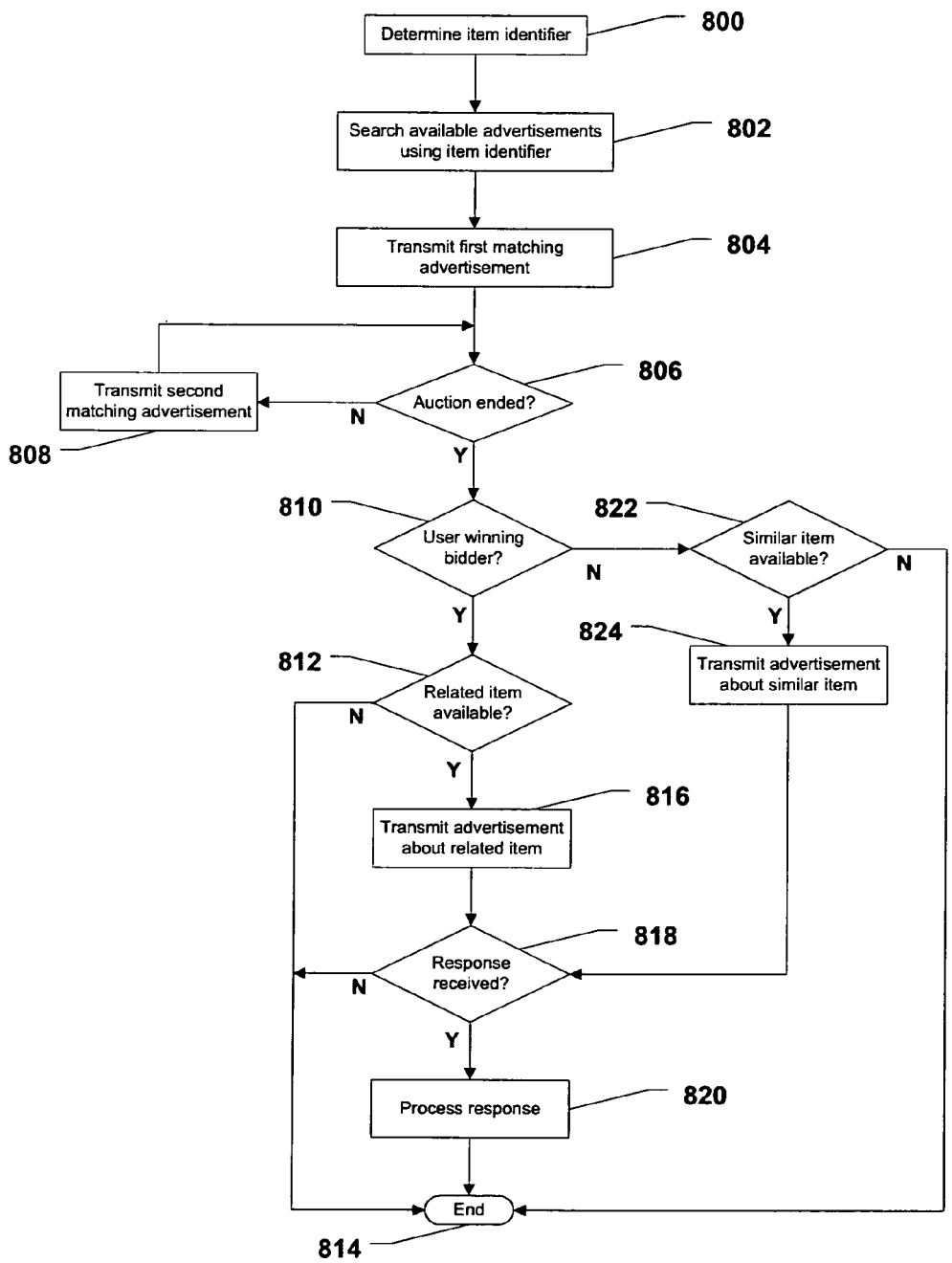
FIG. 8 is a flow chart illustrating another method of advertising.

FIG. 8 illustrates another method of advertising. Beginning at block 800, a system determines an item identifier that is associated with an item that a user is bidding on. At block 802, the system searches a database of available advertisements using the item identifier in order to find matching advertisements. At block 804, the system communicates a first matching advertisement.

Moving to decision step 806, the system determines whether the auction for the item has ended. If not, the system communicates a second matching advertisement to the user at block 808. The method then returns to decision step 806. In a particular embodiment, the system can continue communicating advertisements until the auction for the item has ended. For example, the system can transmit a third matching advertisement, a fourth matching advertisement, and an Nth matching advertisement.

In a particular embodiment, the advertisements can be prioritized based on one or more advertisement placement criteria submitted, and paid for, by advertising clients. For example, a particular advertising client may pay a premium to advertise to users that bid on auto parts. As such, the first matching advertisement may be an advertisement that better matches the criteria than the second matching advertisement. Further, the first matching advertisement may associated with an advertising client that has paid more for that particular advertising spot than an advertising client associated with a second advertisement.

At decision step 806, when the auction ends, the method proceeds to decision step 810 and the system determines whether the user is a winning bidder. If the user is the winning bidder, the method moves to decision step 812 and the system determines whether a related item is available. If a related item is not available, the method ends at state 814. Conversely, if a related item is available, the method moves to block 816 and the system communicates an advertisement about the related item to the user.

Continuing to decision step 818, the system determines whether a user response to the advertisement is received. If so, the system processes the user response at block 820. The method then ends at state 814. In a particular embodiment, the response can be an indication to purchase the related item, an indication to place the related item on a watch list, an indication to submit a bid for the related item, an indication to place the related item on a wish list, or an indication to take other action with respect to the related item.

Returning to decision step 810, if the user is not the winning bidder, the method proceeds to decision step 822 and the system determines whether a similar item is available. If a similar item is not available, the method ends at state 814. On the other hand, if a similar item is available, the method proceeds to block 824 and the system communicates an advertisement about the similar item to the user. The method then proceeds to decision step 818 and continues as described.

FIG. 9 illustrates a method of inserting advertisements into a telephone call. Beginning at block 900, a device, such as a router or switch, receives a first signal that includes an announcement associated with an online auction. In a particular embodiment, the first signal is a telephone call that is related to an online auction. In a particular embodiment, the telephone call is directed to a user of the online auction and includes information related to an item that the user is bidding on at the online auction site. Further, the telephone call includes one or more advertisement insertion windows into which advertisements may be inserted.

At block 902, the device retrieves an identifier that is associated with the first signal. In a particular embodiment, the identifier can identify the item that is the subject of the telephone call or a type of item that is the subject of the telephone call. Moving to block 904, the device retrieves an advertisement. In a particular embodiment, the advertisement is retrieved at least partially based on the identifier associated with the telephone call. For example, if the identifier indicates that the user is bidding on a gambling related item, the device can retrieve an advertisement based on the gambling related item, e.g., an advertisement related for a trip to Las Vegas.

Proceeding to block 906, the device combines at least one audio advertisement with the signal to produce a combine signal. In a particular embodiment, the device inserts the at least one advertisement into the telephone call. In a particular embodiment, the device inserts the advertisement into an advertisement insertion window located in the telephone call. The advertisement insertion window can include a flag to indicate the beginning of the advertisement insertion window and the length of the advertisement insertion window. In a particular embodiment, the length is measured in seconds.

At block 908, the device communicates the combined signal, e.g., the telephone call with the advertisement, over a voice channel. In a particular embodiment, the device also communicates an audible authorization prompt with the combined signal. Moving to decision step 910, the device determines whether the call has ended. If the call has not ended, the method proceeds to block 912, and the device retrieves another advertisement, e.g., based on the previously received identifier associated with the telephone call. The method then returns to block 906 and continues. At decision step 910, when the call ends, the method moves to block 914 and the communication is ended. The method then ends at state 916.

Figure 10:
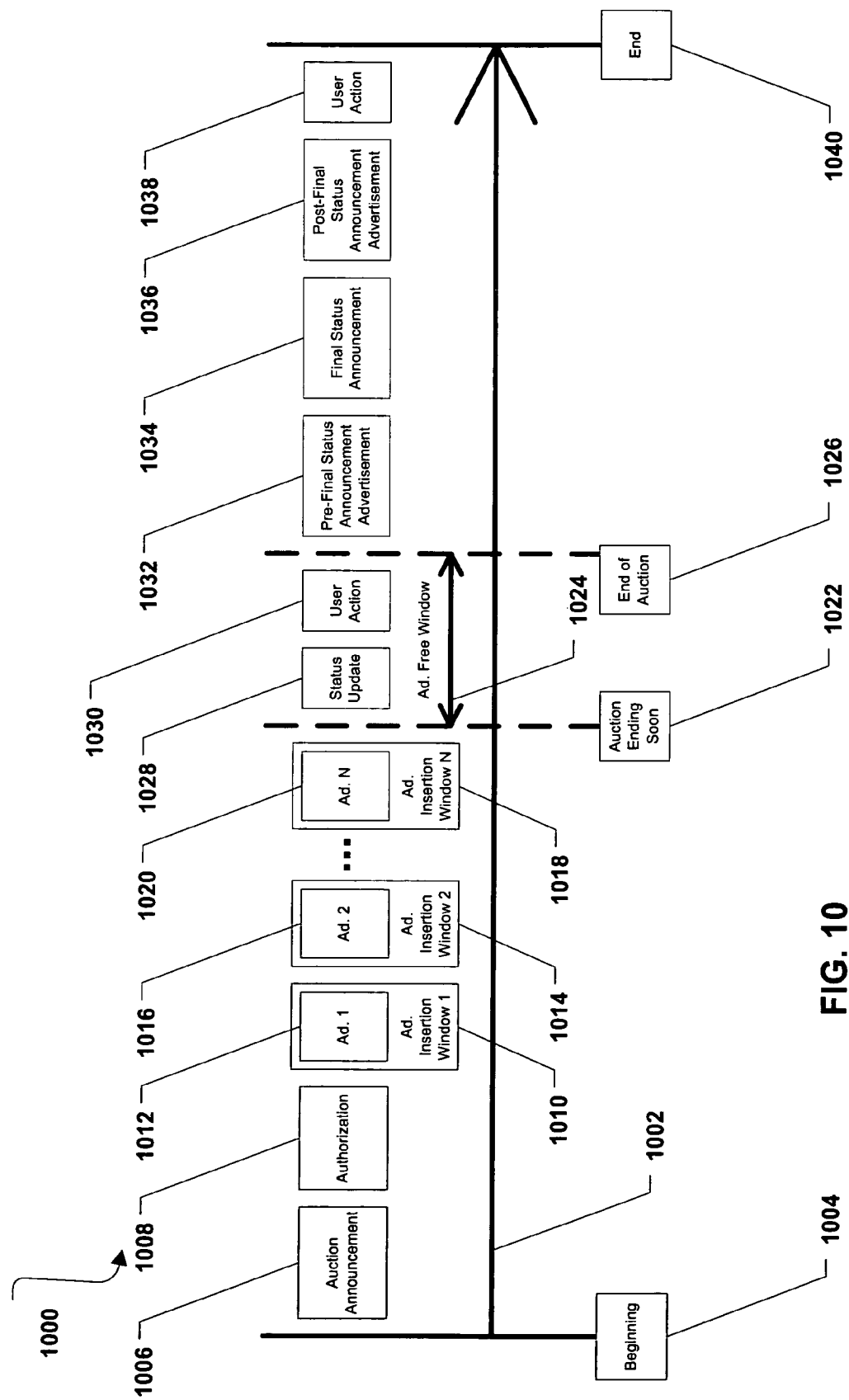
FIG. 10 is a time line associated with a telephone call.

Referring to FIG. 10, an exemplary, non-limiting embodiment, of a telephone call to a user is shown and is generally designated 1000. For clarity and ease of description, the telephone call 1000 is illustrated as a linear timeline. An arrow, labeled 1002, indicates the passing of time during the telephone call 1000.

As shown, the telephone call 1000 includes a beginning 1004. After the telephone call 1000 begins, an auction announcement 1006 is communicated to the user. In a particular embodiment, the auction announcement 1006 identifies the calling party and includes the reason for the call.

As depicted, the telephone call 1000 also includes an authorization prompt 1008. In an illustrative embodiment, the authorization prompt 1008 can prompt the called party for a PIN or other type of authorization. In a particular embodiment, the telephone call 1000 can include a first advertisement insertion window 1010 into which a first advertisement 1012 can be inserted. Also, the telephone call 1000 can include a second advertisement insertion window 1014 into which a second advertisement 1016 can be inserted. Further, the telephone call 1000 can include an Nth advertisement insertion window 1018 into which an Nth advertisement 1020 can be inserted.

In a particular embodiment, the advertisements 1012, 1016, 1020 can be inserted by the system that originates the telephone 1000. Alternatively, the advertisements 1012, 1016, 1020 can be inserted by a router or switch through which the telephone call 1000 is routed or switched to the called party. Additionally, the advertisements 1012, 1016, 1020 can be inserted by any third party system associated with the call or with the auction system.

In a particular embodiment, the advertisements 1012, 1026, 1020 can be targeted advertisements that are related to the reason for the call. For example, the advertisements 1012, 1016, 1020 can be related to an item that the called party is bidding on at an auction website. Alternatively, the advertisements 1012, 1016, 1020 can be general advertisements that are part of a mass marketing campaign for a particular product or service.

FIG. 10 further indicates that the telephone call 1000 includes an auction ending soon indicator 1022. In a particular embodiment, the auction ending soon indicator 1022 occurs at a predetermined time before the end of the auction. FIG. 10 shows that the telephone call 1000 can also include an advertisement-free time period 1024 during which advertisements are not communicated to the called party. As such, the called party may not be distracted by advertisements as the auction for a sought after item winds down. The telephone call 1000 also includes an end of auction indicator 1026. In a particular embodiment, the end of auction indicator 1026 indicates the end of an auction for an item that the called party was bidding on or was watching. In a particular embodiment, the advertisement-free time period 1024 ends at the end of the auction.

As illustrated in FIG. 10, during the advertisement-free time period 1024, the telephone call 1000 can include a status update 1028 and a first user action prompt 1030. In a particular embodiment, the status update 1028 can indicate the current high bid and whether the called party is the current high bidder. Further, the user action prompt 1030 can be prompt for the called party to take action with respect to the item that is the subject of the auction in question. For example, the called party can be prompted to increase a bid for an item, to increase a maximum bid for an item, to buy an item now, or to take other action with respect to the item.

FIG. 10 also shows that the telephone call 1000 can include a pre-final status announcement advertisement 1032 that is communicated to the called party before a final status announcement 1034. In a particular embodiment, the final status announcement 1034 can indicate whether or not the called party has won the auction for the sought after item. The telephone call 1000 can also include a post-final status announcement advertisement 1036 that is communicated to the called party after the final status announcement 1034.

In a particular embodiment, the post-final status announcement advertisement 1036 is a contextual advertisement, i.e., an advertisement formulated in the context of the item that was the reason for the telephone call 1000. Further, in a particular embodiment, if the called party is a winning bidder, the post-final status announcement advertisement 1036 can be an advertisement for a related item. For example, if the item that the called party won is a set of golf clubs, the related item that is the subject of the post-final status announcement advertisement 1036 can be a box of golf balls, a golf bag, a pull cart, or other golf related item.

In another particular embodiment, if the called party is not the winning bidder, the post-final status announcement advertisement 1036 can be an advertisement for a similar item. For example, if the item that the called party did not win is an antique diving helmet, the post-final status announcement advertisement 1036 can be an advertisement for another antique diving helmet that is up for auction at the auction site. As such, the called party may have another chance to bid on an item that is similar to the item that the called party did not win.

As further illustrated in FIG. 10, the telephone call 1000 can include a second user action prompt 1038. In a particular embodiment, the second user action prompt 1038 can be a prompt for the called party to take action with respect to the item that is the subject of the auction in question. For example, the called party can be prompted to bid on an item, to buy an item now, to place an item on a watch list, or to take other action with respect to the item. In either case, if a response is received from the user, the system processes the response. For example, the system can place an item on a watch list or forward a request to place an item on a watch list to an auction system. Additionally, the system can process a purchase request or forward a purchase request to an alternate system where it can be processed at a later time. The system can also post a bid for an item based on a user response. As indicated in FIG. 10, the telephone call 1000 includes an end 1040 that occurs when the call is terminated.

In a particular embodiment, the telephone call 1000 may include multiple announcements throughout the telephone call 1000 before the end of the auction and before the final status announcement 1034 is communicated to the user.

In a particular embodiment, the telephone call 1000 can be transmitted as a data signal. Further, the data signal can be transmitted over a VoIP channel. In a particular embodiment, the data signal can include a first digital signal that represents a human audible announcement that includes audio information associated with an online auction item. Further, the data can include a second digital signal that represents a human audible authorization prompt and a third digital signal that represents at least one human audible advertisement. In a particular embodiment, the first digital signal, the second digital signal, and the third digital signal can be stored in a computer readable memory prior to transmission via the VoIP channel.

With the configuration of structure described above, the system and method of event triggered voice call origination provides a way to monitor auction websites and e-commerce websites and facilitate transactions with those websites. For example, the system can contact a user concerning an item that the user has submitted a bid to purchase at an auction website. In particular, the system can contact the user as the auction for the item is nearing its scheduled end. The system can communicate voice messages to the user concerning the item, e.g., price, current bid status, item category, item sub-category, time remaining, etc.

Also, the system can communicate advertisements to the user during a telephone call to the user concerning an item that the user has bid on, placed on a watch list, or placed on a wish list. The advertisements can be general advertisements or contextual advertisements that are related to the auction item. If the user has won, or otherwise purchased, a particular item, the advertisement can be for an item related to the item that the user has won. If the user failed to win an item, or was unable to purchase the item, the advertisement can be for a similar item.

The above disclosed subject matter is to be considered illustrative, and not restrictive, and the appended claims are intended to cover all such modifications, enhancements, and other embodiments which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An apparatus comprising:
    a call server comprising a hardware processor and a memory, the call server configured to:
        verify biometric input received from a device;
        after verification of the biometric input, transmit an audio announcement to the device, wherein the audio announcement includes information associated with an item available for acquisition via a website;
        receive, from the device, a first input regarding a first offer associated with the item;
        based on a first determination that the first offer is a highest offer for the item, transmit at least one audio advertisement to the device; and
        based on a second determination that the first offer is no longer the highest offer and prior to sale of the item:
            interrupt transmission of the at least one audio advertisement; and
            after interruption of the transmission, transmit a prompt to the device requesting second input associated with a second offer associated with the item.

2. The apparatus of claim 1, wherein the at least one audio advertisement is a targeted audio advertisement associated with the item, and wherein the device is associated with a user corresponding to the biometric input.

3. The apparatus of claim 1, wherein the at least one audio advertisement is a non-targeted audio advertisement.

4. The apparatus of claim 1, wherein the prompt includes a request to purchase the item at a purchase price.

5. The apparatus of claim 1, wherein the call server is further configured to transmit a pre-final status announcement advertisement to the device after an advertisement-free time period ends.

6. The apparatus of claim 5, wherein the pre-final status announcement advertisement comprises a targeted audio advertisement associated with the item.

7. The apparatus of claim 5, wherein the pre-final status announcement advertisement comprises a non-targeted audio advertisement associated with a mass marketing campaign.

8. The apparatus of claim 5, wherein the call server is further configured to transmit a final status announcement to the device, wherein the final status announcement indicates whether a user associated with the device offered a highest price for the item.

9. The apparatus of claim 8, wherein the call server is further configured to transmit a post-final status announcement advertisement to the device.

10. The apparatus of claim 9, wherein the post-final status announcement advertisement includes information associated with a second item that is similar to the item.

11. The apparatus of claim 9, wherein the post-final status announcement advertisement includes information associated with a second item related to the item.

12. The apparatus of claim 9, wherein the call server is further configured to transmit a second prompt to the device after the post-final status announcement advertisement.

13. The apparatus of claim 12, wherein the second prompt comprises a request to purchase a second item, to place the second item on a watch list, to place the second item on a wish list, or any combination thereof.

14. A communication device, comprising:
an interface configured to receive biometric input from a device;
an audio generator configured to initiate transmission of an audio message to the device, wherein the audio message includes information related to a first item; and
a processor configured to:
initiate a communication session with the device;
initiate verification of the biometric input; and
based on detection of a condition associated with a second item and after the initiation of the verification of the biometric input, interrupt the transmission of the audio message to the device during the communication session, wherein the second item is distinct from the first item.

15. The communication device of claim 14, wherein the communication session comprises a telephone call, wherein the condition comprises a commercial variation associated with the second item, wherein the audio message comprises an audio advertisement communicated via a voice channel, wherein the first item and the second item are associated with a same category, wherein the biometric input comprises voice data, and wherein the same category corresponds to a class of a product or a service.

16. The communication device of claim 15, wherein the second item is associated with a wish list of a user of the device, and wherein, in response to the biometric input failing to satisfy authorization criteria, the processor is further configured to terminate the communication session.

17. The communication device of claim 14, wherein the processor corresponds to a call server, and wherein the call server comprises a memory.

18. The communication device of claim 14, wherein the condition comprises a price fluctuation associated with the second item.

19. The communication device of claim 14, wherein the first item and the second item are offered for sale via a website.

20. An apparatus comprising:
a call server comprising a hardware processor and a memory, the call server configured to:
establish a telephone call with a device;
receive biometric input from the device during the telephone call;
after initiation of verification of the biometric input:
initiate transmission of a message to a second device, wherein the message includes information related to a first item; and
based on detection of a condition associated with a second item, interrupt transmission of the message to the second device during the telephone call, wherein the second item is distinct from the first item.

21. The apparatus of claim 20, wherein the second item comprises an item offered for sale, and wherein the call server is further configured to monitor a website for a notification event, the notification event corresponding to a sale of the second item.

22. The apparatus of claim 20, wherein the condition comprises a change associated with a price of the second item, and wherein the second item comprises an item having similar specifications to the first item.

23. A method comprising:
receiving, at a first device, biometric input from a second device during a communication session between the first device and the second device;
during the communication session and after verification of the biometric input:
communicating, to the second device, first commercial transactional information associated with a first item; and
initiating, at the first device, transmission of a message to the second device, the message including second commercial transactional information associated with a second item that is distinct from the first item; and
based on detecting, at the first device, a condition associated with the second item, interrupting transmission of the message.

24. The method of claim 23, wherein the biometric input comprises voice input, and wherein the biometric input is received at a call server.

25. The method of claim 23, wherein the first commercial transactional information comprises first specifications associated with the first item, and wherein the first item comprises a product.

26. The method of claim 25, wherein the second commercial transactional information comprises second specifications associated with the second item, and wherein the second item comprises a service associated with the product.

27. The method of claim 23, further comprising establishing the communication session, wherein the communication session comprises a telephone call with the second device.

28. The method of claim 23, wherein the second commercial transactional information comprises an audio advertisement, and wherein during an advertisement-free time period, the audio advertisement is not communicated.

29. The method of claim 28, wherein the advertisement-free time period commences at a particular time before an end of a sale of the first item.

30. The method of claim 28, further comprising:
prior to verification of the biometric input, transmitting an authorization prompt to the second device to request the biometric input; and
transmitting at least one status update to the second device during the advertisement-free time period.

31. The method of claim 30, wherein the authorization prompt is transmitted during the advertisement-free time period.

32. A non-transitory computer-readable medium storing instructions that are executable by a processor to perform operations, the operations comprising:
- receiving biometric input from a device during a communication session with the device;
- during the communication session and after verification of the biometric input:
  - communicating, to the device, first commercial transactional information associated with a first item; and
  - initiating transmission of a message to the device, the message including second commercial transactional information associated with a second item that is distinct from the first item; and
- based on detecting a condition associated with the second item, interrupting transmission of the message.

33. The non-transitory computer-readable medium of claim 32, wherein the operations further comprise monitoring a website for a notification event, and wherein the website is associated with an on-line marketplace for sale of one or more items.

34. The non-transitory computer-readable medium of claim 32, wherein the device is associated with a potential purchaser of the second item.

35. The non-transitory computer-readable medium of claim 32, wherein the condition comprises a price fluctuation associated with a price of the second item, and wherein the operations further comprise establishing the communication session with the device.

* * * * *